United States Patent [19]

Wilson

[11] Patent Number: 4,890,351
[45] Date of Patent: Jan. 2, 1990

[54] SCRAPERS, ESPECIALLY FOR GRIDDLES, HOTPLATES AND THE LIKE

[75] Inventor: Gordon Wilson, Moor Lodge, England

[73] Assignee: Christopher G. Gibbs, Ravensfield, England

[21] Appl. No.: 222,840

[22] Filed: Jul. 22, 1988

[30] Foreign Application Priority Data

Jul. 30, 1987 [GB] United Kingdom ............... 8718093

[51] Int. Cl.⁴ .................... B26B 27/00; A47L 13/08
[52] U.S. Cl. .................................. 15/236.01; 30/169
[58] Field of Search ........... 15/236.01, 236.02, 236.05, 15/236.08, 236.09; 30/169, 172

[56] References Cited

U.S. PATENT DOCUMENTS

| 1,704,376 | 5/1929 | Teasdale | 15/236.01 |
| 2,787,056 | 4/1957 | Dobratz | 15/236.01 X |
| 3,341,945 | 9/1967 | Chase | 15/236.01 X |
| 4,574,417 | 3/1986 | Magnasco | 15/236.05 |
| 4,617,736 | 10/1986 | McCrary | 30/169 |
| 4,709,478 | 12/1987 | Cortelyou, Jr. | 15/236.01 X |

FOREIGN PATENT DOCUMENTS

| 667794 | 3/1952 | United Kingdom . | |
| 2011820 | 7/1979 | United Kingdom | 30/169 |

Primary Examiner—Edward L. Roberts
Attorney, Agent, or Firm—R. A. Giangiori

[57] ABSTRACT

A hand scraper for griddles and the like has a support (11) for a blade (12) removably secured by a screw (13) projecting forwardly and downwardly from a handgrip (10), and a guard (14) which is conveniently formed of stainless steel rod, is spaced from the underside of the handgrip to afford protection of the fingers and to serve as a stable base for the scraper when not in use. An upwardly extending shield (33) is provided adjacent the blade support (11), to protect the hand from hot fatty debris pushed up over the blade (12).

8 Claims, 4 Drawing Sheets

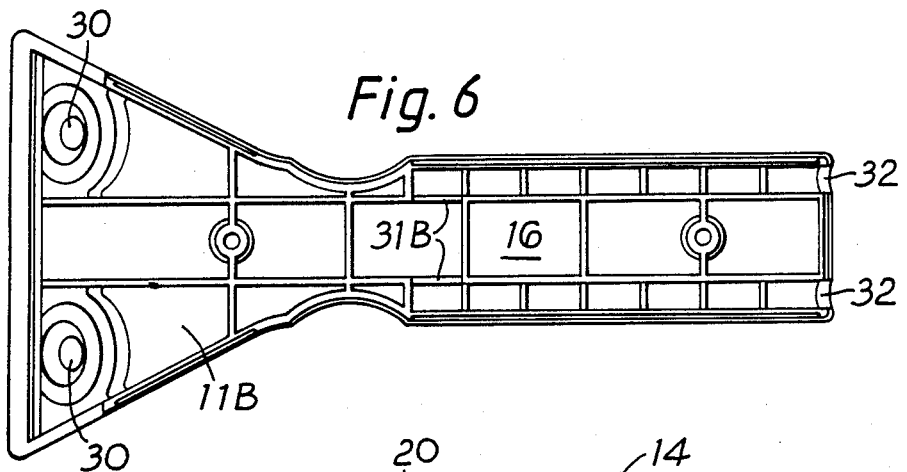
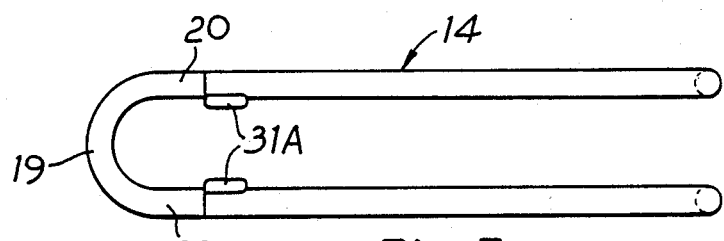
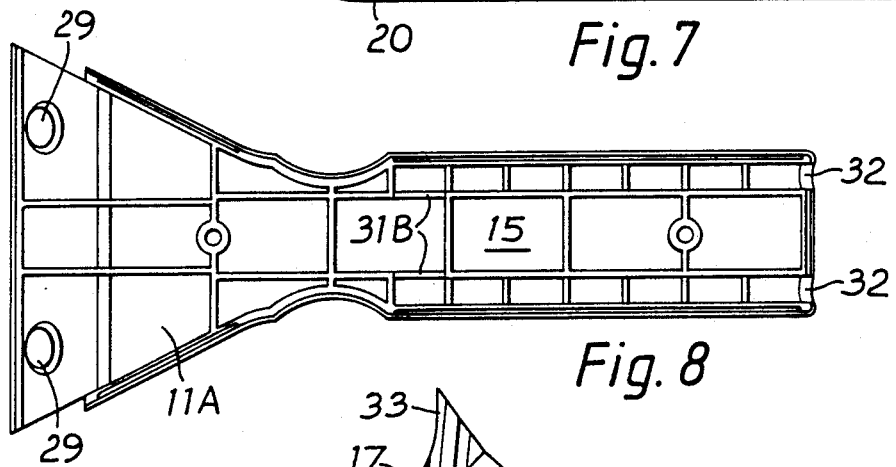
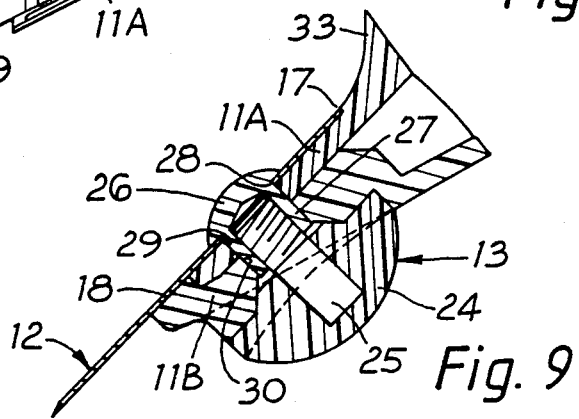

SCRAPERS, ESPECIALLY FOR GRIDDLES, HOTPLATES AND THE LIKE

This invention relates to scrapers, more particularly hand scrapers especially - but not exclusively - for scraping griddles, hotplates and the like.

Hand scrapers are known consisting of a handgrip, a blade support extending from the handgrip, a replaceable scraper blade engageable with the blade support, and securing means for the blade with respect to the blade support, with an operative edges of the blade projecting forwardly and downwardly with respect to a generally horizontal disposition of the handgrip and blade support.

An object of the invention is to provide such a hand scraper adapted for use on a griddle, hotplate or the like with low risk of contact of the hand with the hot surface.

Another object of the invention is to provide means whereby risk of damage to the handgrip and/or blade support is unlikely to result from the scraper being put down, particularly on a griddle, hotplate or the like.

A further object is to provide means whereby the hand scraper of the invention can be hung up when not in use.

Still another object of the invention is to provide a hand scraper of simple, robust construction suitable for use on a griddle, hotplate or the like.

According to the present invention, a hand scraper is the type defined has a guard extending in spaced relationship underneath the handgrip, with respect to the aforesaid disposition thereof, the space between the guard and the handgrip being in excess of the thickness of fingers of a hand used to grip the handgrip.

The disposition of the guard, when the scraper is in use to scrape a griddle, hotplate or the like, between the fingers of the hand gripping the handgrip and the hot surface affords those fingers a considerable measure of protection against contact with the hot surface.

The guard preferably has an appreciable lateral extent with respect to the width of the handgrip and/or blade support, both to afford greater protection to the fingers and a stable base for the scraper to rest on when not in use, and the guard is preferably formed of metal, e.g., stainless steel, or other heat resisting material, thus allowing the scraper to be put down on a hot surface without risk of damage to the guard or by topping over on to the handgrip and/or blade support. The guard is conveniently formed from stainless steel rod bent into a U-shape with the base of the U adjacent the junction of the handgrip and the blade support, with elongate limbs of the U extending parallel with the handgrip and bent back on themselves to anchorages within the handgrip, which is conveniently formed by two plastic body parts (upper and lower) with mating grooves therein including the anchorages and with screws (e.g., two) for securing the body parts together, and the two body parts conveniently also include edge and face locations respectively for the replaceable blade, which may be simply secured by a finger and thumb screw or by a laterally spaced pair of screw fasteners. The upper body part preferably includes an upwardly extending shield adjacent the blade support, to protect the hand from hot fatty debris pushed up over the blade.

The base of the U when inverted (i.e., with the blade support above the handgrip) can be used to hang up the scraper on a hook or peg on a wall or like vertical surface. Alternatively, a special separate bracket can be provided for securing on a wall or like vertical surface and in which the scraper can be hung.

A prototype and a preferred embodiment of the invention will now be described in detail, by way of example only, with reference to the accompanying drawings, in which.

Figure 1:
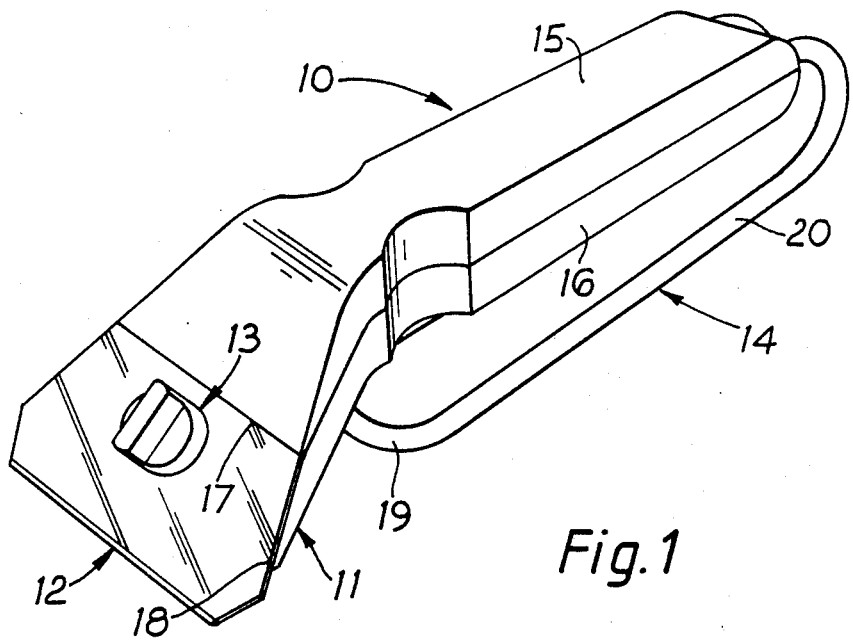
FIG. 1 is a perspective view of the prototype hand scraper in accordance with the invention.
Figure 2:
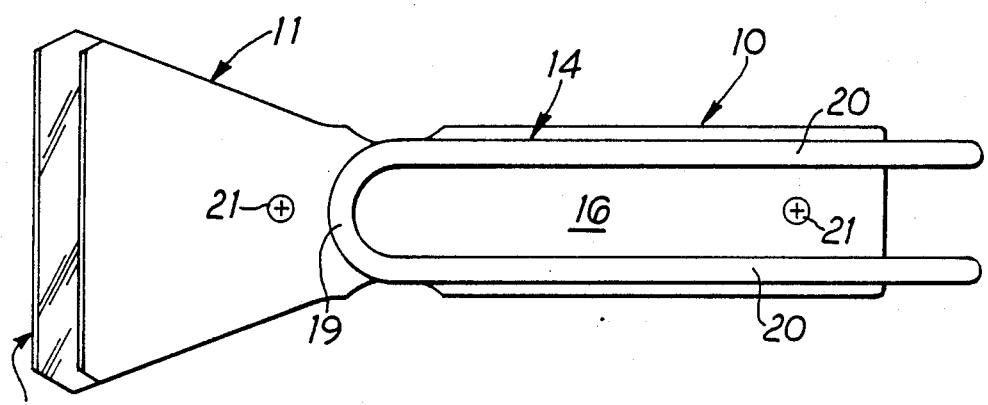
FIG. 2 is the underneath plan of the scraper of FIG. 1.
Figure 4:
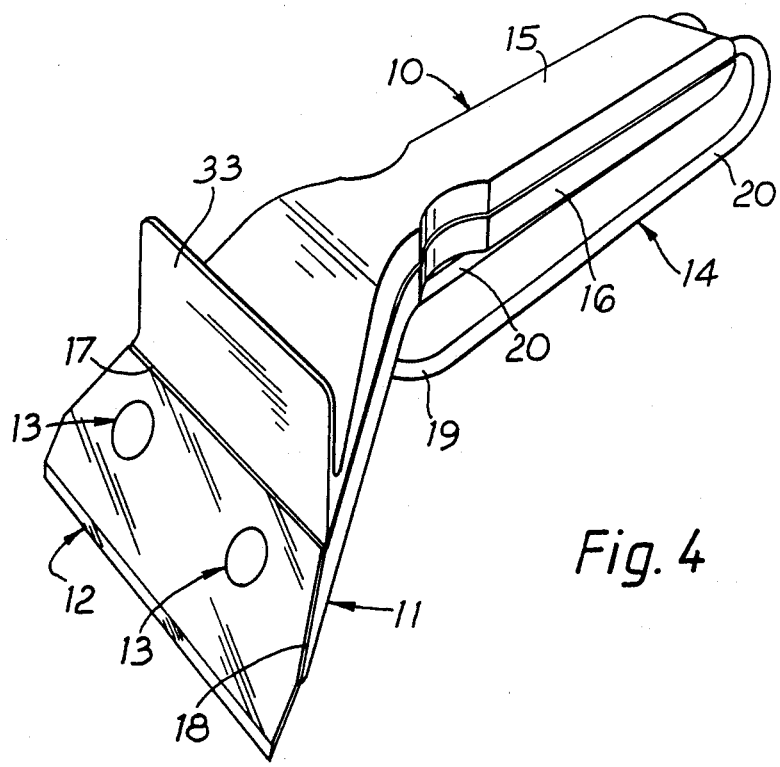
Figure 5:
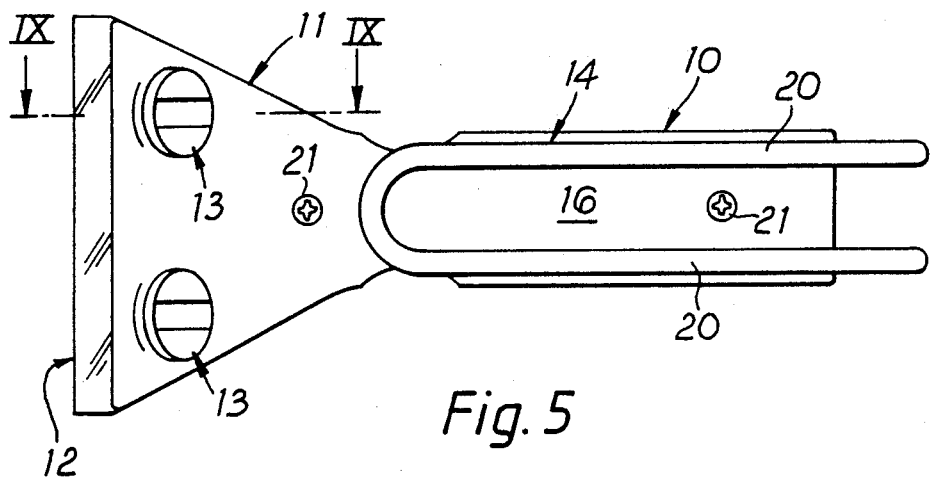

FIGS. 4 and 5 correspond to FIGS. 1 and 2 but show the preferred embodiment of hand scraper in accordance with the invention;

FIG. 6 is a plan view of the lower body part of the scraper of FIGS. 4 and 5;

FIG. 7 is a plan view of the guard;

FIG. 8 is an underneath plan view of the upper body part; and

FIG. 9 is an enlarged fragmentary section on the line IX—IX in FIG. 6.

The scrapers shown in the drawings are intended primarily for scraping griddles or other hot surfaces, and each consists of a handgrip 10, a blade support 11, a replaceable scraper blade 12, securing means 13 for the blade, and a guard 14. The handgrip 10 is formed by two plastics body parts 15, 16 also including edge and face locations 17, 18 respectively for the blade 12.

Figure 3:
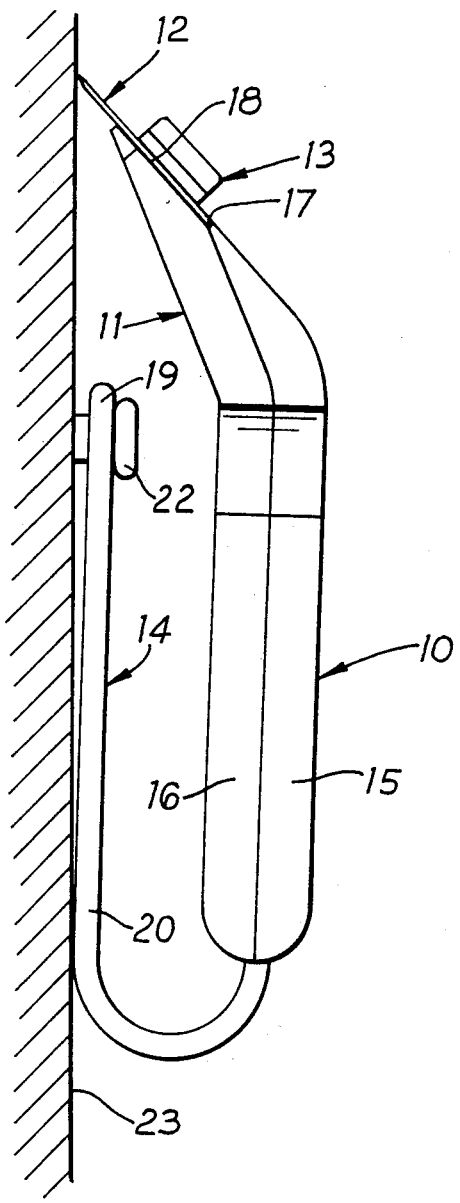
FIG. 3 is a side elevation of the scraper hung on a peg on a wall.

The securing means 13 in FIGS. 1 and 3 consists of a finger and thumb screw passing through a hole (not shown) in the blade 12, and into a tapped hole (also not shown) in the support portion 11 of the lower body part 16. The securing means 13 in FIGS. 4, 5 and 9 consists of a laterally spaced pair of screw fasteners each of which has a plastics knob 24 co-moulded on a screw 25 which screws into a plastics moulding 26 having a spigot portion 27 (FIG. 9 only) fitting a hole 28 in the blade 12 and holes 29, 30 respectively in support portions 11A, 11B of the body parts 15, 16.

The guard 14 is formed from stainless steel rod bent into a U-shape, with the base 19 of the U adjacent the junction of the handgrip 10 and the blade support 11, with elongate limbs 20 of the U extending parallel with the handgrip and bent back on themselves to anchorages 31A, 31B (FIGS. 6 to 8 only) within mating grooves 32 (FIGS. 6 and 8 only) in the body parts 15, 16, which are secured together by two screws 21.

The limbs 20 of the guard 14 are spaced from the handgrip 10 in excess of the thickness of fingers of a hand used to grip the handgrip and afford those fingers a considerable measure of protection against contact with the hot surface of a griddle. An appreciable lateral extend of the guard 14, determined by the spacing of the limbs 20 from each other, assists in this protection, as well as affording a stable base for the scraper to rest on when not in use, but the base 19 of the U can be used to hang up the scraper, as on a peg 22 on a wall 23 as shown in FIG. 3; alternatively, a special separate bracket (not shown) can be provided for securing on a wall or like vertical surface and in which the scraper can be hung.

In the preferred embodiment of FIGS. 4 to 9, the upper body part 15 includes an upwardly extending shield 23 (FIGS. 4 and 9 only) adjacent the blade support 11, to protect the hand from hot fatty debris pushed up over the blade 12.

What I claim is:

1. A hand scraper consisting of a handgrip, a blade support extending from the handgrip, a replaceable scraper blade engageable with the blade support, and securing means for the blade with respect to the blade support, with an operative edge of the blade projecting forwardly and downwardly with respect to a generally horizontal disposition of the handgrip and blade support, together with a guard formed in a U-shaped configuration with elongate limbs of the U extending generally parallel with the handgrip and curving back on themselves to anchorages within the handgrip, the space between the guard and the handgrip being in excess of the thickness of fingers of a hand used to grip the handgrip.

2. A scraper as in claim 1, wherein the guard has an appreciable lateral extent with respect to the width of the handgrip.

3. A scraper as in claim 1, wherein the handgrip is formed by two plastic body parts with mating grooves therein including the anchorages and with screws for securing the body parts together.

4. A scraper as in claim 1, wherein the blade support includes one edge location and one face location for the replaceable blade.

5. A scraper as in claim 4, wherein the securing means for the replaceable scraper blade is a finger and thumb screw.

6. A scraper as in claim 1 wherein the handgrip includes an upwardly extending shield adjacent the blade support.

7. A scraper as in claim 1, wherein the guard is formed from stainless steel rod.

8. A scraper as in claim 1, wherein the securing means for the replaceable scraper blade consists of a laterally spaced pair of screw fasteners, and each screw fastener has a plastics knob co-moulded on a screw which screws into a nut having a spigot portion secured in a hole in the blade and fitting a hole in the blade support.

* * * * *